US008046886B2

(12) United States Patent
DeMania et al.

(10) Patent No.: US 8,046,886 B2
(45) Date of Patent: Nov. 1, 2011

(54) FIXTURE FOR MOUNTING ARTICULATED TURBINE BUCKETS

(75) Inventors: Alan R. DeMania, Niskayuna, NY (US); Thomas J. Farineau, Schoharie, NY (US); Keith A. Schoonmaker, Valatie, NY (US)

(73) Assignee: General Electric Company, Schenectady, NY (US)

( * ) Notice: Subject to any disclaimer, the term of this patent is extended or adjusted under 35 U.S.C. 154(b) by 175 days.

(21) Appl. No.: 12/649,778

(22) Filed: Dec. 30, 2009

(65) Prior Publication Data

US 2011/0154631 A1 Jun. 30, 2011

(51) Int. Cl.
*B23P 15/04* (2006.01)

(52) U.S. Cl. .................... 29/23.51; 29/889.2; 29/889.21

(58) Field of Classification Search ................. 29/889.2, 29/889.21, 23.51, 281.1, 281.4
See application file for complete search history.

(56) References Cited

U.S. PATENT DOCUMENTS

| | | | | |
|---|---|---|---|---|
| 5,026,032 | A | 6/1991 | Ortolano et al. | |
| 5,183,244 | A | 2/1993 | Ortolano et al. | |
| 6,640,437 | B2 * | 11/2003 | McFarland | 29/889.22 |
| 2008/0134503 | A1 * | 6/2008 | Crain et al. | 29/888.025 |
| 2009/0183349 | A1 * | 7/2009 | Walsh et al. | 29/23.51 |

* cited by examiner

*Primary Examiner* — David Bryant
*Assistant Examiner* — Moshe Wilensky
(74) *Attorney, Agent, or Firm* — Ernest G. Cusick; Frank A. Landgraff

(57) ABSTRACT

A fixture and method for assembling axial entry buckets with complex geometry to a rotor wheel is provided. The fixture features an inner and an outer split ring shaft clamp, which is bolted together around the rotor wheel packing diameter and provides a mounting base. The transfer ring mounts around and abutting the rotor wheel. The transfer ring includes a circumferential slot to accept bucket-holders. The bucket holders loaded with turbine buckets, inserted onto the transfer ring and moved circumferentially around the transfer ring to align the turbine buckets to slots on the rotor wheel. Pressure is applied to spiral the buckets from the bucket-holders into final position in slots on the rotor wheel.

13 Claims, 10 Drawing Sheets

FIXTURE FOR MOUNTING ARTICULATED TURBINE BUCKETS

BACKGROUND OF THE INVENTION

The invention relates generally to turbomachines and more specifically to a fixture and a method for mounting articulated turbine buckets in axial entry slots of rotor wheels of the turbomachines.

Rotors for turbomachines are often machined from large forgings. Rotor wheels cut from the forgings are often slotted to accept the roots of turbomachine buckets for mounting. As the demand for greater turbomachine output and more efficient turbomachine performance continues to increase, larger and more articulated turbomachine buckets are being placed into service.

The foregoing factors are of particular importance in relation to last-stage steam turbine buckets having improved aerodynamic, thermodynamic and mechanical properties. Last-stage buckets for turbines have for some time been the subject of substantial developmental work. It is highly desirable to optimize the performance of these last-stage buckets to reduce aerodynamic losses and to improve the thermodynamic performance of the turbine. Last-stage buckets are exposed to a wide range of flows, loads and strong dynamic forces. Factors that affect the final bucket profile design include the active length of the bucket, the pitch diameter and the high operating speed in both supersonic and subsonic flow regions. Damping and bucket fatigue are factors which must also be considered in the mechanical design of the bucket and its profile. These mechanical and dynamic response properties of the buckets, as well as others, such as aero-thermodynamic properties or material selection, all influence the optimum bucket profile. The last-stage steam turbine buckets require, therefore, a precisely defined bucket profile for optimal performance with minimal losses over a wide operating range. The bucket may often include a complex blade geometry with overhang.

Adjacent turbine buckets on a rotor wheel are typically connected together by some form of cover bands or shroud bands around the periphery to confine the working fluid within a well-defined path and to increase the rigidity of the buckets. The interlocking shrouds may often present interferences in assembling buckets on the rotor wheel. Inner platforms for the buckets may include tied-in edges, which also may interfere with assembly on the rotor wheel.

Accordingly, it would be desirable to provide equipment and methods for facilitating loading of articulated buckets onto rotor wheels for turbomachines.

BRIEF DESCRIPTION OF THE INVENTION

Briefly in accordance with one aspect of the present invention, a fixture adapted for mounting a turbine buckets with dovetails to an axial entry rotor wheel of a turbomachine is provided. The fixture includes a transfer ring mounted circumferentially around a packing diameter forward of an axial entry rotor wheel being loaded with buckets. The transfer ring is butted to a front of the rotor wheel and includes a circumferential slot for loading. Turbine bucket-holders are provided, each which includes a dovetail slot for receiving a turbine bucket with a complimentary dovetail and further includes a root adapted to slide within the circumferential slot of the transfer ring. Means are provided for positioning the turbine buckets holders circumferentially around the transfer ring to orient the bucket-holders for alignment with dovetailed slots of the axial entry rotor wheel.

According to another aspect of the present invention, a method is provided for mounting articulated turbine buckets on a rotor wheel with axial-entry dovetailed bucket slots. The method includes mounting a transfer ring to a rotor shaft forward of a rotor wheel to be populated with a plurality of turbine buckets. Each dovetailed turbine bucket for the rotor wheel is loaded into a complimentary dovetail slot of a turbine bucket-holder. The method includes loading the turbine bucket-holders onto the transfer ring, where each turbine bucket-holder is placed in circumferential alignment with a dovetailed slot of the rotor wheel. The turbine buckets are urged axially from the turbine bucket-holder into the corresponding dovetailed slot of the rotor wheel.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including allowing easy assembly of complex buckets onto a rotor wheel for turbomachines. The invention is directed particularly to assembly on rotor wheels with axial entry dovetails.

Complex bucket design and vane shape have sometimes been avoided in the past due to assembly issues. The inventive fixture allows design engineers flexibility to incorporate advanced aerodynamic design features without concern for assembly. Complex vane design with overhangs, complex blade root geometry with overhang and tied-in edges and extended and interlocked shroud features may be accommodated with the present inventive fixture. The present invention further provides a robust method to assemble and disassemble advanced designed buckets.

A split ring shaft clamp is mounted around the wheel-packing diameter. The entire assembly fixture is placed forward of the existing rotor wheel to be loaded with turbine buckets. A transfer ring provides a t-slot for accommodating turbine bucket-holders. The transfer ring is dowelled and bolted to the split ring shaft. The bucket-holders have a same shape dovetail as the bucket dovetail with larger tolerance to provide ease of fit to a dovetail on the rotor wheel. Turbine buckets are placed in each turbine bucket-holder until the transfer ring is almost full. The last bucket is the inserted radially. After the last turbine bucket is loaded onto the transfer ring, the turbine buckets are then aligned and engaged in the dovetail slots of the rotor wheel. Turbine buckets are then spiraled in the axial direction until buckets are in the final installed position, completing the assembly.

Figure 1:
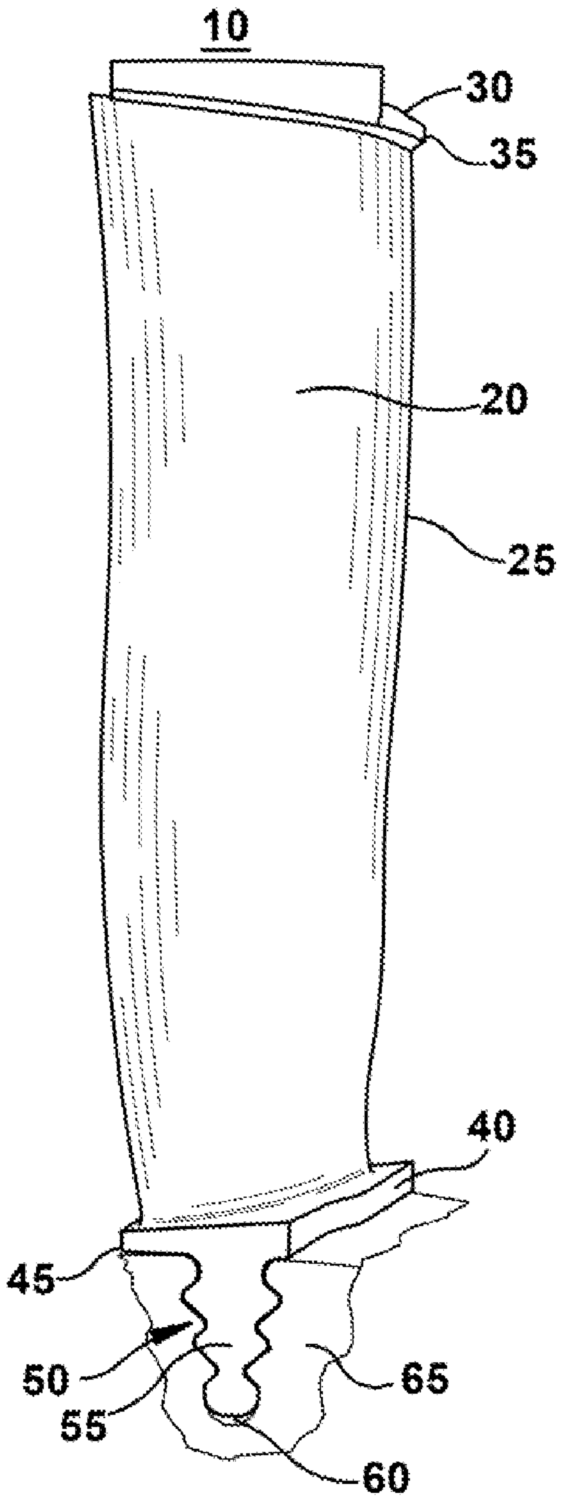
FIG. 1 illustrates an articulated bucket for a steam turbine.

FIG. 1 illustrates an advanced design turbine bucket that may advantageously utilize the inventive fixture and method. However, it should be recognized that the fixture and method are applicable for use with conventional design turbine buckets as well. The turbine bucket 10 includes a vane 20, a tip shroud 30 and a platform 40 with a root 45. The root 45 may include a dovetail 50 adapted for axial entry into a complimentary dovetail slot (not shown) of a rotor wheel (not shown).

According to an embodiment of the present invention, a fixture for mounting a plurality of articulated turbine buckets with dovetails to an axial entry rotor wheel of a turbomachine is provided. The turbomachine may be a steam turbine and may be a gas turbine.

Figure 3:
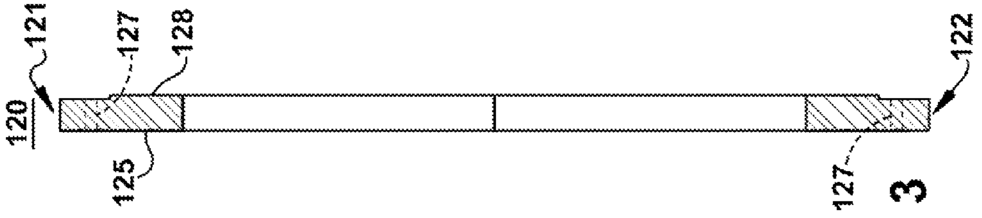
FIG. 3 illustrates a side view of a shaft clamp
Figure 2:
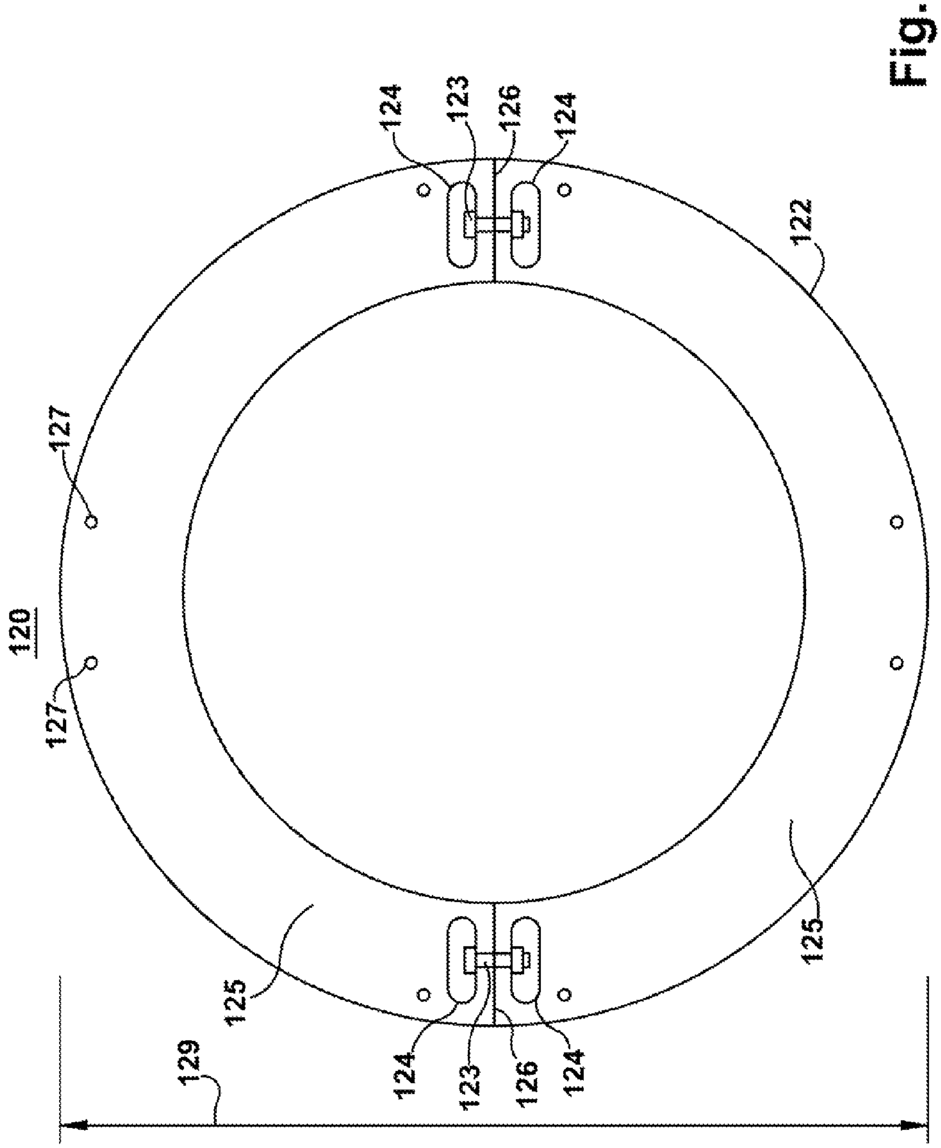
FIG. 2 illustrates a front view of a shaft clamp.

FIG. 2 illustrates a front view of a shaft clamp 120. FIG. 3 illustrates a side view of a shaft clamp 120. The shaft clamp 120 is adapted for mounting on a packing diameter forward of an axial entry rotor wheel being loaded with buckets. The shaft clamp 120 includes an upper half ring section 121 and a lower half ring section 122. For mounting, the two half rings sections 121, 122 may be bolted together around a packing diameter of the rotor shaft (not shown). A bolting arrangement 123 may be provided within recesses 124 disposed on a front 125 of each half-ring section at mating joint 126 for clamping the two half-ring sections around the packing diameter (riot shown). The shaft clamp 120 may further include multiple axial throughholes 127 around the circumference of the two half-ring sections for bolting a front of a transfer ring 140 (FIG. 4) to a back 128 of the shaft clamp. The outer diameter 129 of the shaft clamp may be smaller than the outer diameter of the transfer ring so as provide unobstructed access to the front of the transfer ring for bucket loading operations. The axial location for mounting the shaft clamp on the rotor may be chosen to abut the transfer ring with respect to the rotor wheel for loading buckets. A cushioning material may be placed between an inner surface of the shaft clamp and the packing diameter to prevent damage to the outer surface of the packing diameter when the shaft clamp is attached.

Figure 5:
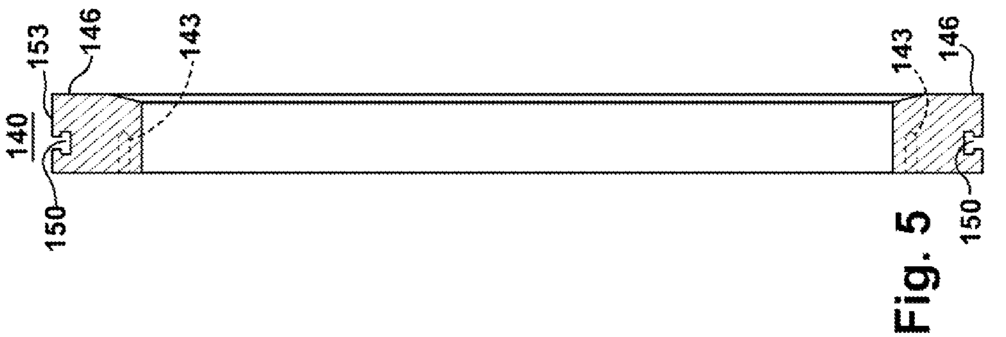
FIG. 5 illustrates a side view of a transfer ring.
Figure 4:
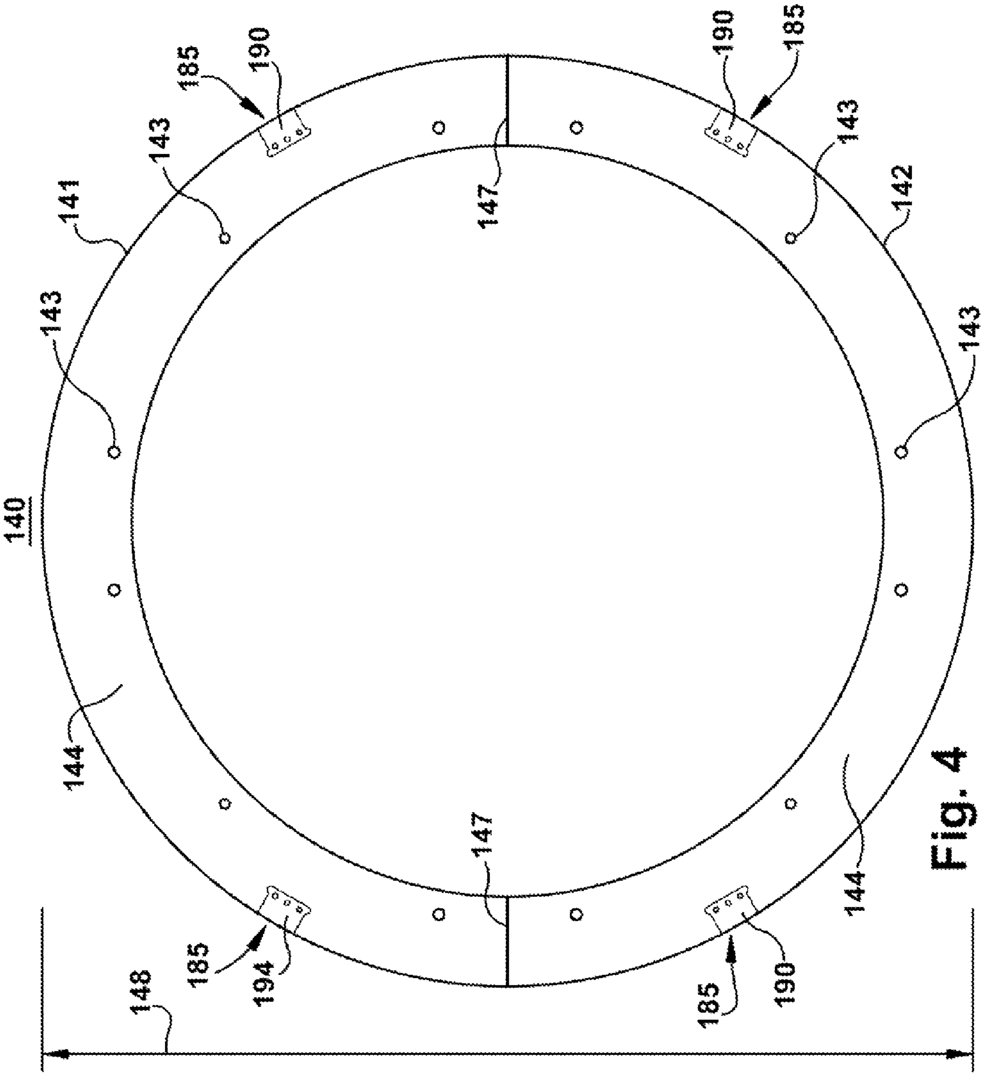
FIG. 4 illustrates front view of a transfer ring.

FIG. 4 illustrates a front view of a transfer ring. FIG. 5 illustrates a side view of a transfer ring. The transfer ring 140 may be mounted circumferentially around the packing diameter forward of an axial entry rotor wheel being loaded with turbine buckets. The transfer ring 140 may include an upper half ring section 141 and a lower half ring section 142 split at horizontal joints 147. Here the transfer ring sections may include tapped holes 143 on the front 144 for mounting to the back of the shaft clamp 120. When mounted on the shaft clamp 120, the back 146 of the transfer ring 140 may be butted to a front of the rotor wheel (not shown) and radially positioned to promote transfer of the dovetailed buckets (not shown) from the transfer ring to the dovetail slots of the rotor wheel. The transfer ring 140 includes a circumferential slot 150 into which the root of turbine bucket-holders (not shown) may be inserted.

Figure 6:
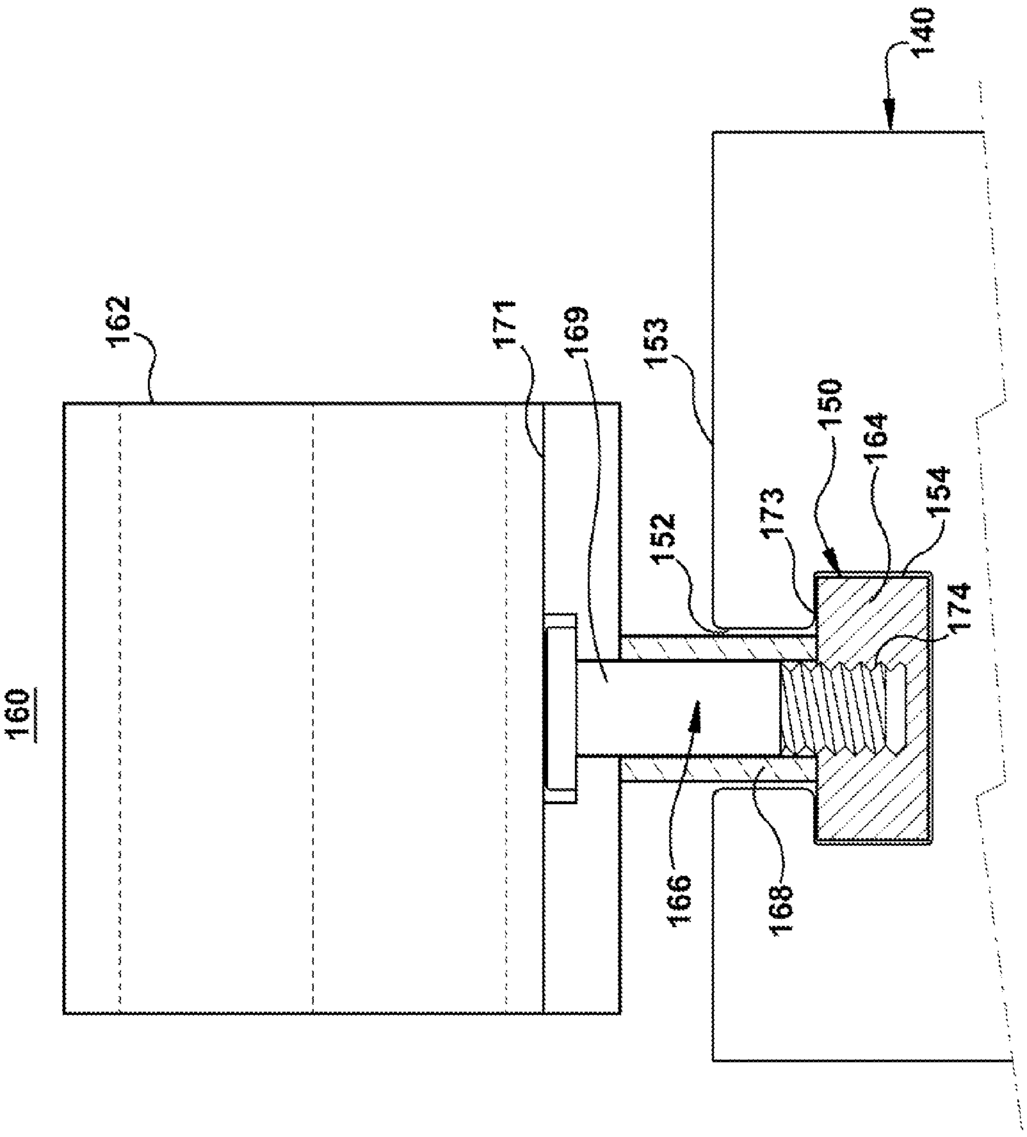
FIG. 6 illustrates a cross-sectional view of a turbine bucket holder.

FIG. 6 illustrates a cross-sectional view of a turbine bucket holder 160 with an expanded representation of the circumferential slot 150. The circumferential slot 160 may include an outer slot portion 152 connecting an outer radial surface 153 of the transfer ring and an inner slot portion 154. Together the slots form an inverted T-shape track opening from the outer radial surface 153 of the transfer ring 140.

Multiple turbine bucket-holders 160 equal in number to the dovetailed slots on the rotor wheel for receiving turbine buckets are provided. A body 162 of each turbine bucket-holder 160 includes a dovetail slot 165 on an outer end for receiving a turbine bucket 10 carrying a complimentary dovetail. The dovetailed slots 165 of the turbine bucket-holders 160 may be oriented axially for installation when the slots of the rotor wheel (not shown) are axially oriented. For rotor wheels with dovetail slots skewed with respect to the axis of the rotor, the slots of the turbine bucket-holder may be similarly skewed for mating.

Each turbine bucket-holder 160 further includes a root 164 on an inner end, the root being adapted to slide within the inner portion of the circumferential slot ISO of the transfer ring. A stem 166 may be attached between an inner end of the body 162 and an outer end of the root 164. The stem 166 establishes a radial height of the body 162 with respect to the rotor wheel and hence the radial height of the dovetail slot of the turbine bucket-holder.

The turbine bucket-holder 160 may further include means for height adjustment, allowing the radial position of the body 162 to be adjusted. The stem 166 may include a hollow spacer 168. The spacer 168 separates the body 162 and the root 164. A screw 169 may extend from the bottom 171 of the dovetail slot through the body 162, through the spacer 168, and through the top surface of the root 164 into threaded hole. Providing spacers 168 with different lengths changes the position of the body 162 with respect to the transfer ring 140 and thus also changes the position of the dovetail slot 165 within the body 162 relative to the rotor wheel, thus allowing for transfer of turbine buckets 160 to dovetail slots of a rotor wheel wherein the dovetail slots are at various radial positions. Length of the screws 169 is also modified in this case for the changing length of the spacers 168.

Figure 8:
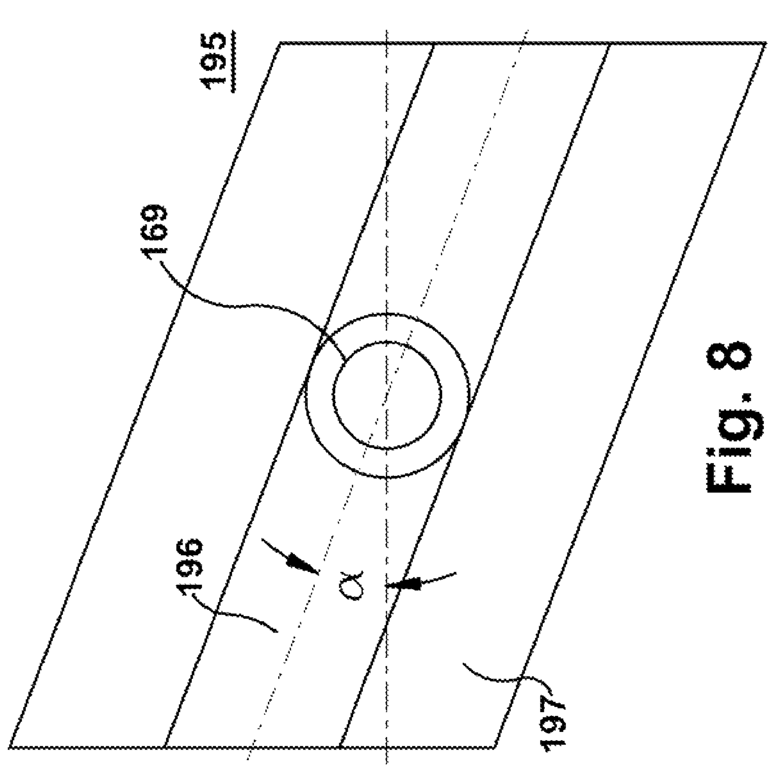
FIG. 8 illustrates a top view for turbine bucket holder with skewed orientation of body.
Figure 7:
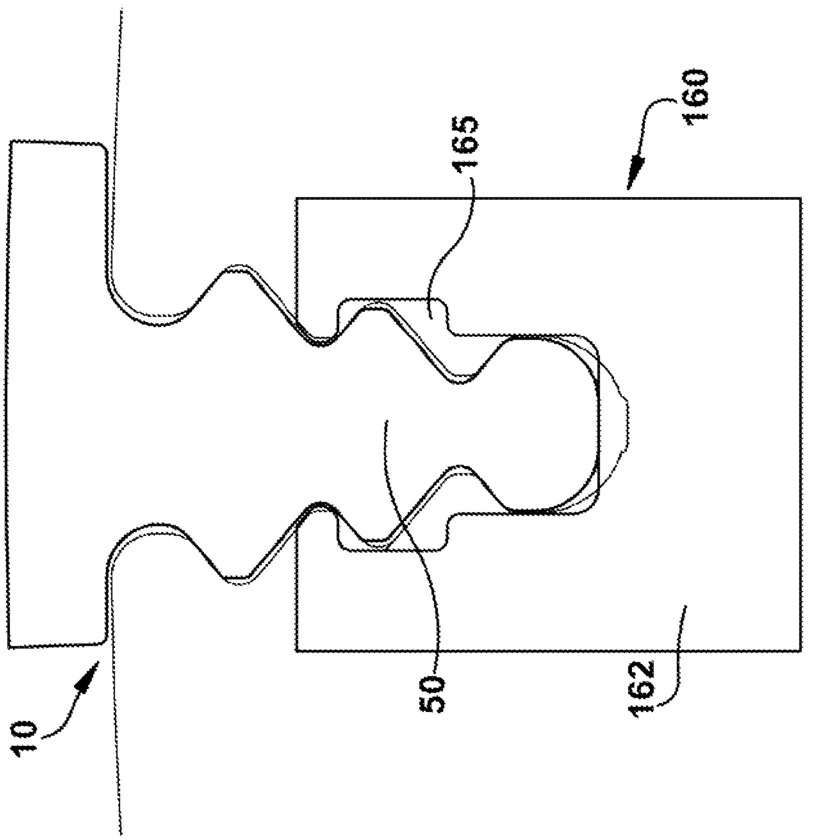
FIG. 7 illustrates an end view of body for turbine bucket holder.

FIG. 7 illustrates an end view of body 162 for bucket holder 160 with dovetailed slot 165 accepting dovetail 50 of a turbine bucket 10. FIG. 8 illustrates a top view for bucket holder 195 with skewed orientation of angle $\alpha$ 196 on body 197 for skewed axial entry into slots of rotor wheel (not shown).

Means for positioning the plurality of turbine bucket holders circumferentially around the transfer ring 140 is provided. Such circumferential positioning of the turbine bucket-holders allows the dovetail slots in the body of each bucket-holder to be circumferentially positioned in alignment with the dovetailed slots of the axial entry rotor wheel. The transfer ring 140 includes at least one loading opening 185 on the front 147 (FIG. 4). The loading openings 185 are adapted to admitting the root of the turbine bucket-holder into the circumferential slot 150 of the transfer ring 140. A detachable closure plate 190 is provided for each opening (FIG. 4). The loading openings 185 with detachable closure plates 190 may be disposed symmetrically around the front of the transfer ring 140 for facilitating mounting of the turbine bucket-holders over a full circumference of transfer ring.

When the turbine bucket-holder is mounted in the transfer ring, the body of the turbine bucket-holder rides above an outer radial surface of the transfer ring. The stem 166 of the turbine bucket-holder 160 slides within the outer slot portion 152 of the transfer ring 140. The root 164 of the turbine bucket-holder 160 being smaller than the inner slot portion 154 of the transfer ring 140, slides within the inner slot portion 154. The root 164, being larger in size than the outer slot portion 153, is restrained in the inner slot 152 of the transfer ring 140.

The dovetail slot 165 of the turbine bucket-holder 160 may include a larger tolerance than the dovetail slot 65 of the rotor wheel 60 for ease of fit when the turbine bucket 10 is being transferred to the rotor wheel.

Figure 9:
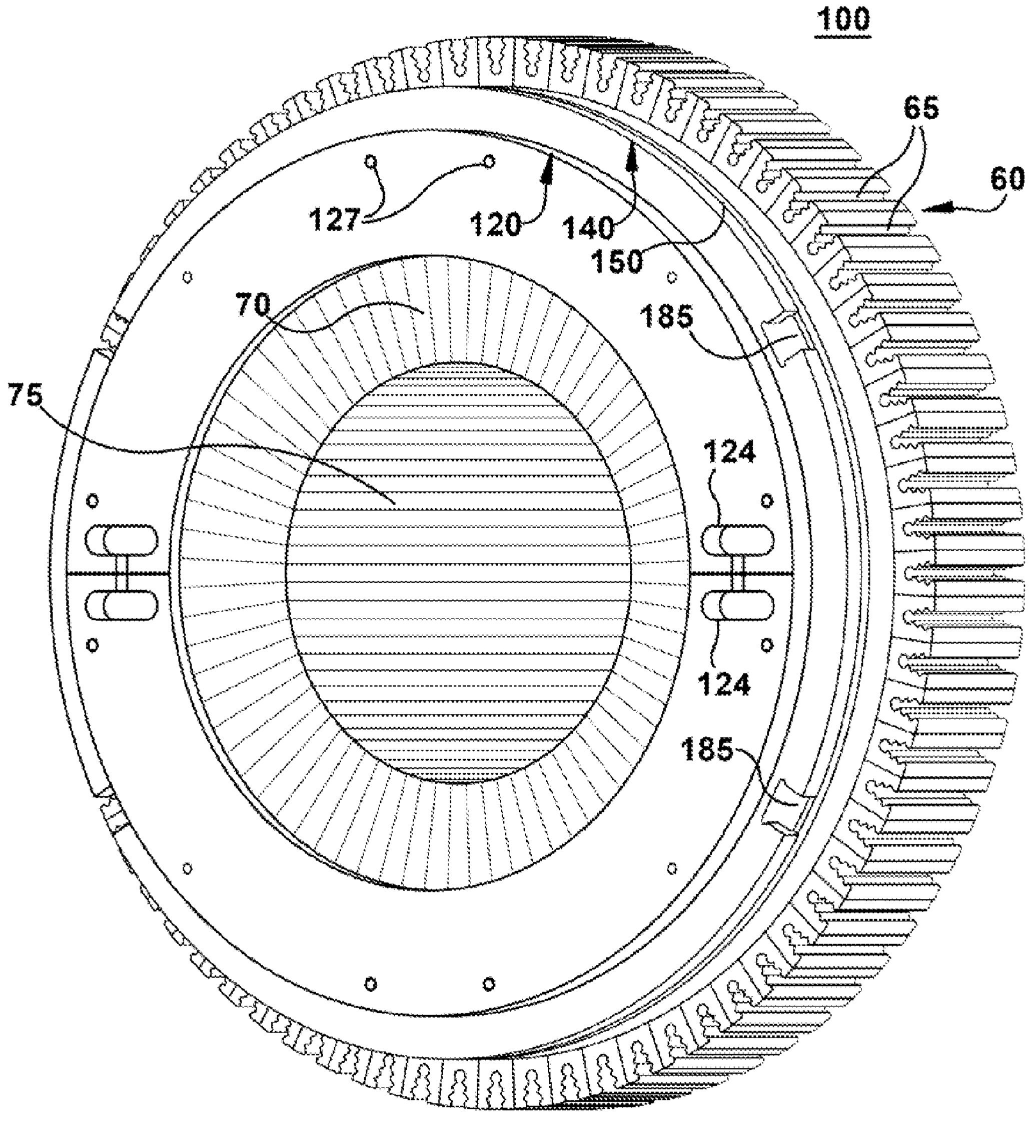
FIG. 9 illustrates a rotor with a shaft clamp and transfer ring installed over the shaft clamp.

FIG. 9 illustrates a fixture 100 for mounting articulated turbine buckets on a rotor wheel. A rotor wheel 60 with axial dovetail slots 65 is provided with a shaft clamp 120 installed on a packing diameter 70 of a rotor 75 and the transfer ring 140 is installed onto the shaft clamp and abutting the front 61 of the rotor wheel.

Figure 10:
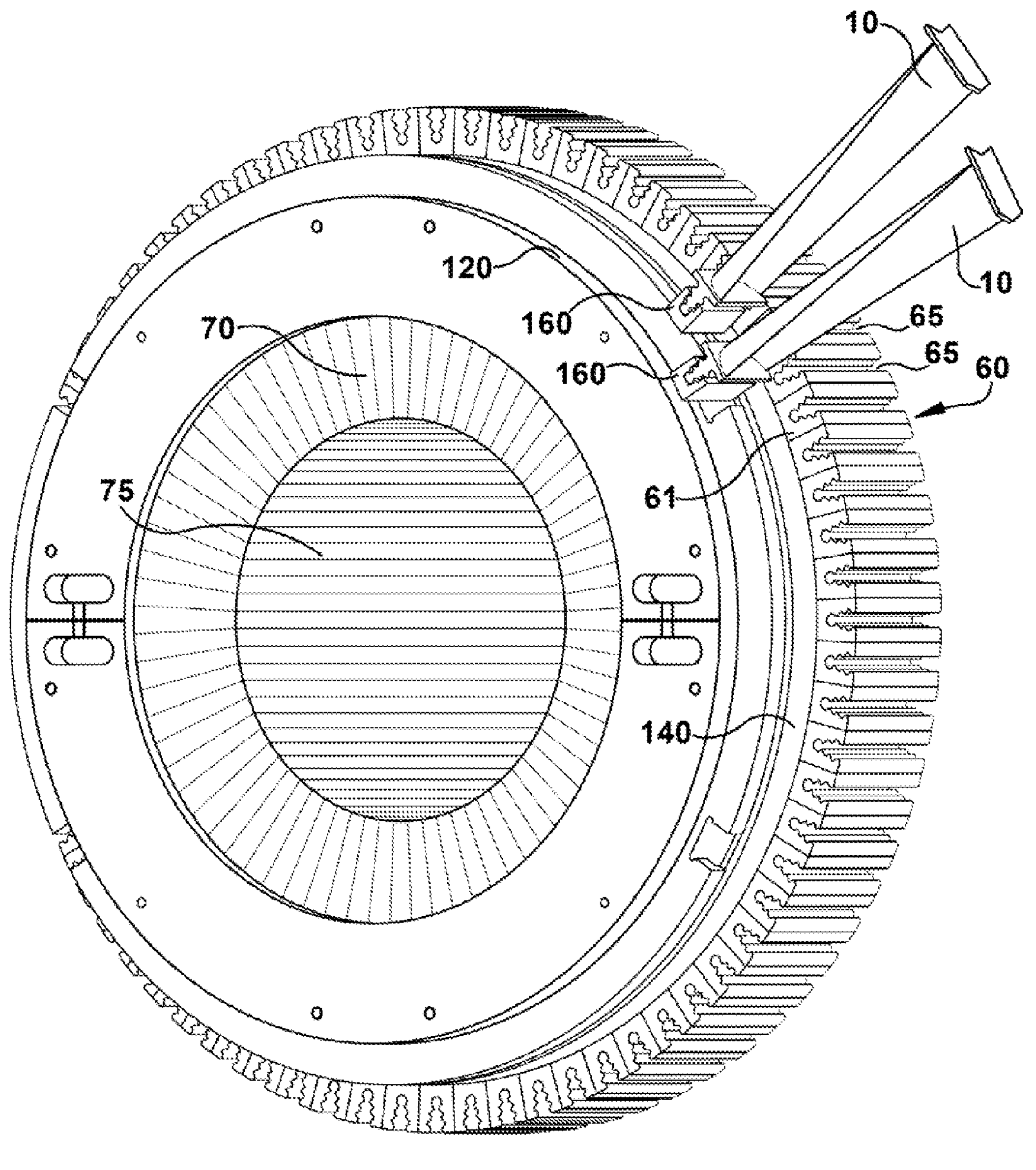
FIG. 10 illustrates a rotor with a transfer fixture partially loaded with turbine bucket-holders.
Figure 11:
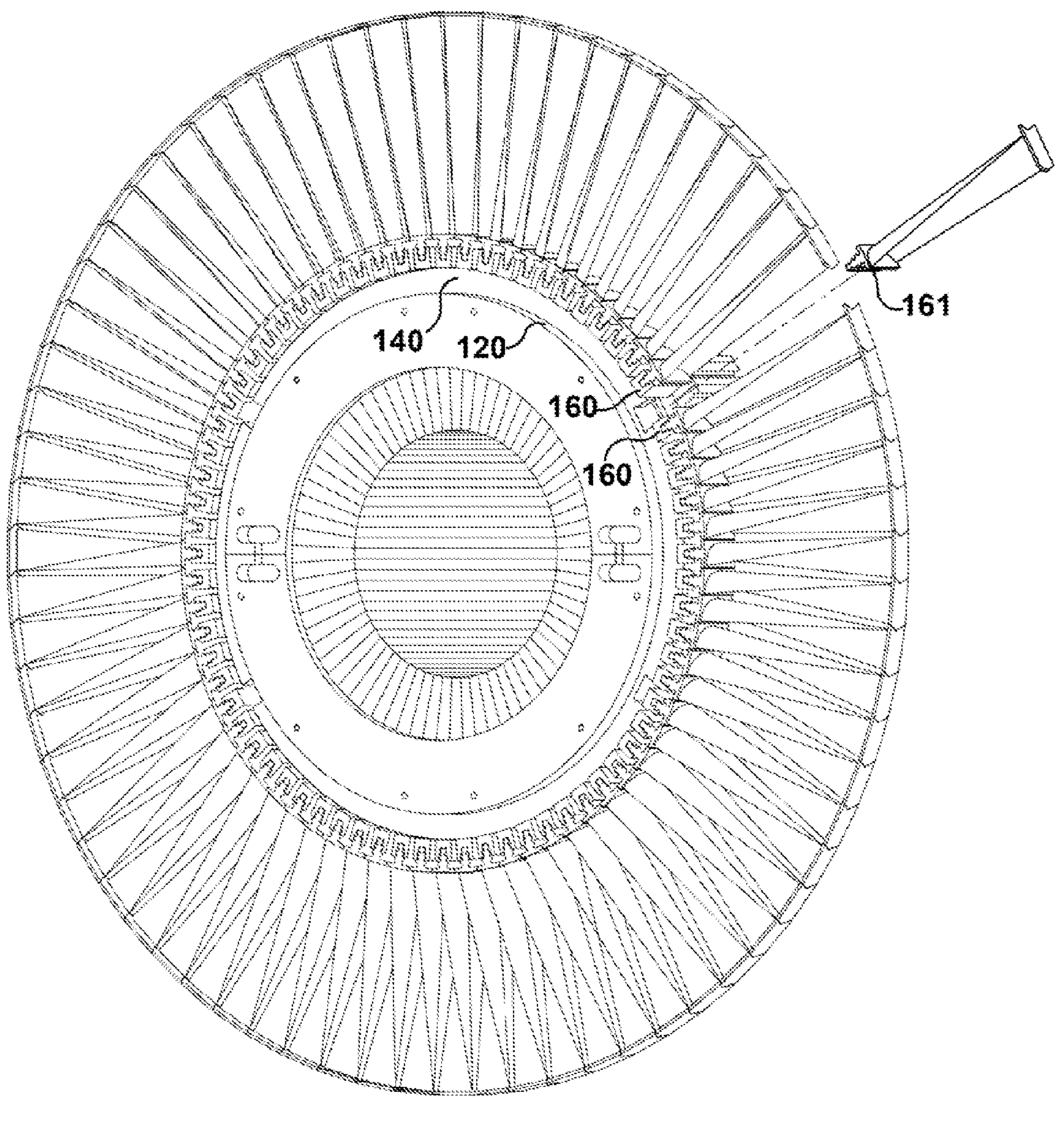
FIG. 11 illustrates radial insertion of the last turbine bucket-holder onto the transfer ring.
Figure 12:
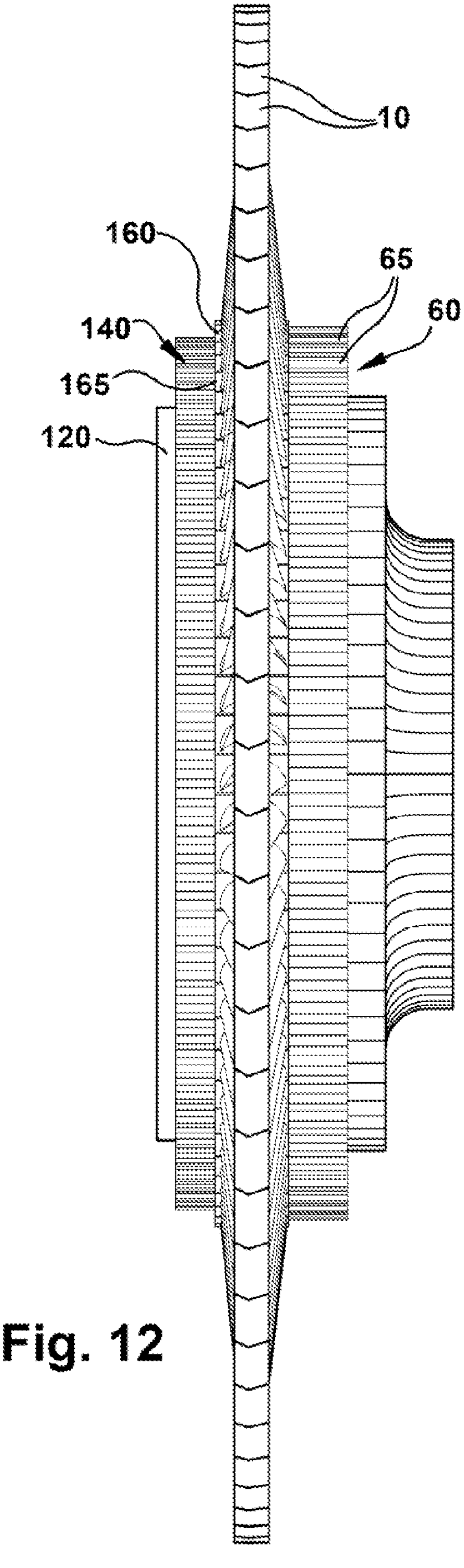
FIG. 12 illustrates transfer of turbine buckets from the transfer ring to the rotor wheel.

FIG. 10 illustrates a rotor wheel 60 with a transfer ring 140 partially loaded with turbine bucket-holders 160 carrying turbine buckets 10. FIG. 11 illustrates radial insertion of the last turbine bucket-holder 161 onto the transfer ring 140. FIG. 12 illustrates transfer of turbine buckets 160 from the transfer ring 140 to the axial dovetail slots 65 of the rotor wheel 60.

Figure 13:
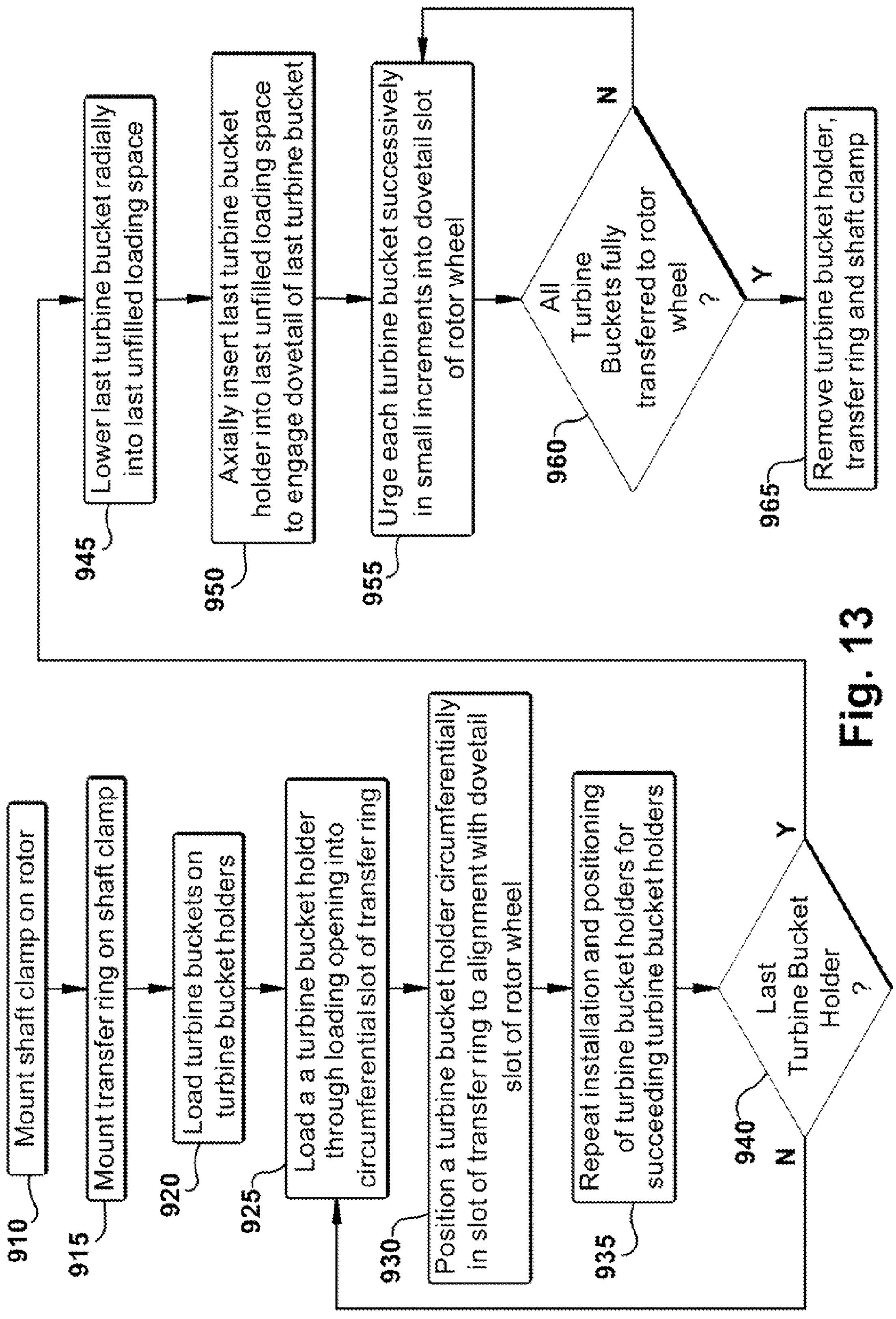
FIG. 13 illustrates a flow chart for a method of loading an axial entry rotor wheel with articulated buckets using an embodiment of the inventive fixture.

FIG. 13 illustrates a flow chart for a method of loading an axial entry rotor wheel with articulated buckets using an embodiment of the inventive fixture. In accordance with the present invention, a method is provided to assemble advanced bucket geometries, which provide enhanced performance. The inventive fixture may be employed for loading the articulated buckets onto an axial-entry dovetail-slotted rotor wheel. Step 910 provides for mounting the two half sections of the shaft clamp around the rotor packing area forward of the rotor wheel being populated. Step 915 includes mounting the two half sections of the transfer ring to the shaft clamp with the back of transfer ring butted against the front of the rotor wheel to be populated. Step 920 provides for loading the turbine buckets in the dovetail slots of the turbine bucket-holders. A last turbine bucket is installed differently as will be described below. With at least one closure plate removed to provide access to the loading openings of the transfer ring, in step 925 a first turbine bucket-holder is loaded axially through one or more loading openings into the circumferential slots of the transfer ring. The turbine bucket-holder, in step 930, is slid around the circumferential slot of the transfer ring until lined up with a dovetail slot of the rotor wheel. Steps 925 and 930 are repeated in step 935 until only space for the last turbine bucket-holder remains at the location of a loading opening. Closure plates for the loading openings may be installed when the all turbine bucket-holders have filled the associated section of the transfer ring. In step 945 the last uninstalled turbine bucket is lowered inward radially into the remaining unfilled loading space. In step 950, the last remaining turbine bucket-holder is inserted axially into the loading space below the last remaining turbine bucket to engage the dovetail of the turbine bucket. The remaining closure plate may then be installed. Each of the turbine buckets may be urged axially from the turbine bucket-holder into the corresponding dovetailed slot of the rotor wheel. Each turbine bucket is successively urged axially into the associated dovetail slot of the rotor wheel in a slight increment in step 955. The successive increments are then repeated in step 960 until all the turbine buckets are fully engaged in the dovetail slots of the rotor wheel. The fixture may then be removed in step 965.

The fixture may also be used to facilitate removal of turbine buckets. The split shaft ring and the transfer ring are mounted to a rotor shaft forward of a rotor wheel populated with a plurality of turbine buckets. The turbine bucket-holders are loaded onto the transfer ring. Each turbine bucket-holder is placed in circumferential alignment with a dovetailed slot of the rotor wheel. The turbine buckets are urged axially from dovetail slots of the rotor wheel into the corresponding dovetail slots of the turbine bucket-holder. The bucket holders may then be removed from the transfer ring.

While various embodiments are described herein, it will be appreciated from the specification that various combinations of elements, variations or improvements therein may be made, and are within the scope of the invention.

The invention claimed is:

1. A fixture adapted for mounting a plurality of turbine buckets with dovetails to an axial entry rotor wheel of a turbomachine, the fixture comprising:

a transfer ring mounted circumferentially around a packing diameter forward of an axial entry rotor wheel being loaded with buckets, the transfer ring being butted to a front of the rotor wheel and including a circumferential slot;

a plurality of turbine bucket-holders, each turbine bucket-holder including a dovetail slot for receiving a turbine bucket with a complimentary dovetail and further including a root adapted to slide within the circumferential slot of the transfer ring; and means for positioning the plurality of turbine buckets holders circumferentially around the transfer ring wherein each of the plurality of bucket-holders may be oriented in alignment with one of a plurality of dovetailed slots of the axial entry rotor wheel.

2. The fixture according to claim 1, wherein the turbine bucket-holders are adapted for mounting of articulated turbine buckets on the rotor wheel.

3. The fixture according to claim 1 wherein when installed in transfer ring, the dovetailed slots of the plurality of turbine bucket-holders are aligned axially with respect to an axis of the rotor wheel.

4. The fixture according to claim 1 wherein when installed in transfer ring, the dovetailed slots of the plurality of turbine bucket-holders are aligned in skew with respect to an axis of the rotor.

5. The fixture according to claim 1 wherein the turbomachine is a steam turbine.

6. The fixture according to claim 1 wherein the turbomachine is a gas turbine.

7. The fixture according to claim 1, further comprising:

a shaft clamp adapted for mounting on a packing diameter forward of an axial entry rotor wheel being loaded with buckets; wherein the shaft clamp includes an upper half ring section and a lower half ring section, bolted together around the packing diameter.

8. The fixture according to claim 7, wherein the transfer ring further comprises two half rings bolted around the shaft clamp.

9. The fixture according to claim 1, further comprising:

a body of the bucket-holder arranged on an outer radial surface of the transfer ring;

a root of the bucket-holder;

a stem of the bucket-holder attached between the body and the root;

an outer portion of the circumferential slot allowing travel of the stem of the bucket-holder; and an inner portion of the circumferential slot allowing travel of the root and restraining the root.

10. The fixture according to claim 9, wherein the turbine bucket-holder includes a radial height adjustment adapted for aligning the radial height of the dovetail slot of the turbine bucket-holder relative to the dovetail slot for a turbine bucket on the rotor wheel.

11. The fixture according to claim 9, wherein the turbine bucket-holder includes a dovetail slot with a larger tolerance than the dovetail slot of the rotor wheel for ease of fit.

12. The fixture according to claim 7, the means for positioning comprising:

at least one opening on a forward face of the transfer ring adapted to admitting the root of the turbine bucket-holder into the circumferential slot of the transfer ring; and a detachable closure plate for each of the at least one openings.

13. The fixture according to claim 12, wherein the openings with detachable closure plates are disposed symmetrically around the forward face of the transfer ring for admitting the turbine bucket-holders over a full circumference of transfer ring.

* * * * *